(12) United States Patent
Brückner et al.

(10) Patent No.: US 7,701,933 B2
(45) Date of Patent: Apr. 20, 2010

(54) METHOD FOR TRANSMITTING A DATA TELEGRAM BETWEEN A REAL-TIME DOMAIN AND A NON-REAL-TIME DOMAIN AND A COUPLING UNIT

(75) Inventors: Dieter Brückner, Unterleiterbach (DE); Franz-Josef Götz, Heideck (DE); Dieter Klotz, Fürth (DE); Jürgen Schimmer, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 993 days.

(21) Appl. No.: 10/490,408

(22) PCT Filed: Sep. 26, 2002

(86) PCT No.: PCT/DE02/03649

§ 371 (c)(1),
(2), (4) Date: Mar. 23, 2004

(87) PCT Pub. No.: WO03/027784

PCT Pub. Date: Apr. 3, 2003

(65) Prior Publication Data

US 2004/0246988 A1 Dec. 9, 2004

(30) Foreign Application Priority Data

Sep. 26, 2001 (DE) ................. 101 47 448
Sep. 5, 2002 (DE) ................. 102 41 183

(51) Int. Cl.
*H04L 12/28* (2006.01)
(52) U.S. Cl. ..................... 370/389; 370/466

(58) Field of Classification Search ......... 370/465–468, 370/230.1, 235, 312, 313, 357, 360, 389, 370/390, 392, 393
See application file for complete search history.

(56) References Cited

U.S. PATENT DOCUMENTS 5,327,428 A * 7/1994 Van As et al. ............... 370/353

(Continued)

FOREIGN PATENT DOCUMENTS

DE         100 58 524 A1    6/2002

(Continued)

OTHER PUBLICATIONS

Martin Buchwitz and Martin Jetter, "Das Netz ist die Steuerung", Elektronik, Franzis Verlag GmbH, Munchen, Germany, vol. 48, Nr. Aug. 1999, pp. 38, 51-52, 54-56.

*Primary Examiner*—Kevin C Harper
*Assistant Examiner*—Mon Cheri S Davenport (57) ABSTRACT

The invention relates to a method for transmitting a data telegram from a non-real-time domain to a real-time domain, comprising the following steps: generation of a non-real-time data telegram comprising a useful data zone, the data telegram containing a real-time or a non-real-time identifier in addition to a data telegram identifier (identifier i) in the useful data zone thereof when the real time identifier is provided; monitoring of the non-real-time data telegram for the presence of a real time identifier by the coupling unit if the real-time identifier is provided; transmission of the useful data and real-time identifier (identifier i) from the useful data zone of the non-real-time data telegram to a user interface of the coupling node; storage of the useful data in a storage zone of a communication memory which is associated with the identifier.

15 Claims, 4 Drawing Sheets

U.S. PATENT DOCUMENTS 5,594,734 A * 1/1997 Worsley et al. ........ 370/395.53
2001/0002195 A1 5/2001 Fellman et al.

FOREIGN PATENT DOCUMENTS

| EP | 0 510 290 A1 | 10/1992 |
| EP | 0510290 A1 * | 10/1992 |
| EP | 1 091 523 A2 | 4/2001 |
| WO | WO 02/43336 A1 | 5/2002 |
| WO | WO 02/076034 A2 | 9/2002 |

* cited by examiner

METHOD FOR TRANSMITTING A DATA TELEGRAM BETWEEN A REAL-TIME DOMAIN AND A NON-REAL-TIME DOMAIN AND A COUPLING UNIT

CROSS REFERENCE TO RELATED APPLICATIONS

This application is the US National Stage of International Application No. PCT/DE02/03649, filed Sep. 26, 2002 and claims the benefit thereof. The International Application claims the benefits of German application No. 10147448.2 DE filed Sep. 26, 2001, and German application No. 10241183.2 DE filed Sep. 5, 2002, all of the applications are incorporated by reference herein in their entirety.

FIELD OF INVENTION

The invention relates to a method for transmitting a data telegram between a non-realtime domain and a realtime domain, a coupling unit and a computer program product.

BACKGROUND OF INVENTION

An asynchronous, clocked communication system with equidistant characteristics is taken to mean a system a system with the least two subscribers who are connected via a data network for the purposes of mutual exchange of data. in this case data is ex changed cyclically in equidistant communication cycles which are specified by the communication clock used by the system.

Subscribers are for example central automation devices, programming, project planning or operating devices, peripheral devices such a s input/output modules, drives, actors, sensors, Programmable Logic Controllers (PLC) or other control units, computers or machines which exchange electronic data with other machines and process data, especially from other machines. Subscribers are also called network nodes or nodes.

Control units in this document are taken to mean closed-loop controllers or control units of all types, for example coupling units (known as switches) and/or switch controllers. Typical examples of data networks used are bus systems such as Field Bus, Profibus, Ethernet, Industrial Ethernet, FireWire or also PC-internal bus systems (PCI), etc., but especially also the isochronous Realtime Ethernet.

Data networks allow communication between a number of subscribers by networking, that is connecting the individual subscribers to each other. Communication here means the transmission of data between the subscribers. The data to be transmitted is sent in this case as data telegrams, i.e. the data is packed into a number of packets and sent in this form over the data network to the corresponding recipient. The term data packet is thus used. The term transmission of data is used in this document fully synonymously with the above-mentioned transmission of data telegrams or data packets.

In distributed automation systems, for example in the area of drive technology, specific data must arrive at specific times at the intended subscribers and must be processed by the recipients. This is referred to as realtime-critical data or data traffic since if the data does not arrive at its intended destination at the right time this can produce undesired results at the subscriber by contrast with non-realtime critical, for example Internet or Intranet based data communication. In accordance with the IEC 61491, EN61491 SERCOS interface successful realtime critical data traffic of the type mentioned can be guaranteed in distributed automation systems.

Automation components (e.g. controllers, drives, . . . ) nowadays generally have an interface to a cyclically clocked communication system. A run level of the automation components (fast-cycle) (e.g. positional control in a controller, torque control of the drive) is synchronized to the communication cycle. This defines the communication timing. Other lower-performance algorithms (slow-cycle) (e.g. temperature controllers) of the automation components can also only communicate via this communication clock with other components (e.g. binary switches for fans, pumps, . . . ), although a slower cycle would be adequate. Using only one communication clock for transmission of all information in the system produces high demands on the bandwidth of the transmission link.

A peripheral image is made up of a sum of data sets which are exchanged using realtime communication with other automation devices. Data sets which are received from an automation device using realtime communication are input data. Data sets which are sent from an automation device using realtime communication are output data. In an automation device input data is processed and new output data created in an application program which is called in cycles. The application program can comprise a number of different functions which work at different times with different data sets. It is not mandatory for all functions of the application program to be called in each application cycle. This means that all input data is not processed and new output data generated in each application cycle.

A system and a method for transmitting realtime critical and non-realtime critical data via switchable data networks is known from DE 10058524 A1. Here the transmission cycle is subdivided into a subcycle for the realtime critical data and a subcycle for the non-realtime critical data.

A common disadvantage of communication systems with realtime capabilities known from the prior art is that existing non-realtime capable system components cannot be inserted into the real time capable communications system. For this reason setting up a realtime capable communication system requires a high level of investment since all the existing non-realtime capable systems have to be replaced.

SUMMARY OF INVENTION

The object of the invention is to create an improved method for transmission of data telegrams between a non-realtime critical system and a realtime critical system as well as a corresponding coupling unit and computer program product, which makes it possible to couple a non-realtime capable subscriber into a real time capable communication system.

The objects underlying the invention are achieved in each case with the features of the dependent patent claims. Preferred embodiments of the invention are specified in the dependent patent claims.

The invention allows communication between real time and non-realtime domains and also allows communication in both directions. To achieve this object software is installed on a subscriber in which both realtime and also non-realtime communication is going on, which allows it to be coupled to the real time capable domain. This software is used to "pack" the information needed for realtime communication into a non-realtime data telegram or to integrate the information from a non-realtime data telegram into a real time telegram. The information involved here is in particular the realtime telegram identification which will be used in the realtime domain for the planned cyclic communication.

The Information packed in the non realtime data telegram will be "unpacked" by a coupling unit which receives the non-realtime data telegram from the non-realtime domain. The useful data contained in the non-realtime data telegram is written into a storage zone of a communication memory which is uniquely defined by the realtime data telegram identification.

To bring the data telegram into the realtime domain a send list on the coupling unit side will be cyclically processed. This cyclic processing of the send list is undertaken in accordance with the timing scheme specified for the realtime domain and independently of the non-realtime domain. The transmission of the non-realtime data telegram intended for realtime communication over the non-realtime domain can thus take place asynchronously with the cyclic processing of the send list. As a result of this the option of coupling the real time and non-realtime domains is realized.

The same applies to the other direction. A realtime data telegram from the realtime domain intended for the non-realtime domain has useful data which will be "packed" into a non-realtime data telegram and forwarded by the coupling unit to a subscriber in the non-realtime domain.

In accordance with a preferred embodiment of the invention the non-realtime domain is an Ethernet and the realtime domain is an isochronous, cyclic realtime Ethernet. Preferably the isochronous, cyclic realtime Ethernet has a communications cycle which can be divided up into a realtime subcycle and a non-realtime subcycle. Such a communication system is known per se from DE 10058524 A1.

For example non-realtime data telegrams from the non-realtime domain which are intended for non-realtime communication are sent via the non-realtime subcycle, whereas non-real time data telegrams from the non-realtime domain which are intended for realtime communication are brought in via the realtime subcycle.

Previous Ethernet components in automation technology are only suitable for the non-realtime, that is non-cyclic data traffic. The coupling of such components with future realtime capable modules must however be made possible on the basis of the existing networks.

In this case especially time-critical data of a non-realtime module (for example actual values of a shaft) must be brought into the real time are a of the realtime capable components to guarantee data transfer within an isochronous cycle (e.g. to the process computer which calculates the new threshold values of the shaft). In the reverse direction too, the transfer of data from a realtime domain to a non-realtime domain must also be possible, to make available realtime data within an isochronous cycle to a non-realtime subscriber (e.g. transfer of the new threshold values from the process computer to the shaft).

By contrast with non-realtime communication, realtime communication is planned communication. Each component in the realtime domain knows in advance when and at which receive and transmit ports it must receive and forward or bring in which realtime telegrams. The transmit point of each realtime telegram is thus precisely determined. For non-realtime data which is to be sent in the realtime domain it is thus true to say that it must have been brought in at the latest by the start of transmission of its telegram in real time.

A realtime-capable Ethernet switch consists of receive and transmit ports which can both transmit and receive realtime (RT) data cyclically, as well as supporting the previous non-realtime (NRT) operation. Such an Ethernet switch represents the link between the realtime and the non-realtime domain. The ports connected to the NRT (Non-realtime) domain operate exclusively in conventional non-realtime mode whereas the ports at the RT (realtime) domain support both realtime and also a non-realtime operation. For NRT data which is to be sent via the RT communication of the RT domain, the following preferably applies:

The NRT telegrams must be sent with high priority in the feeding switch in the NRT domain in order to minimize the transfer times in the NRT domain.

The NRT telegrams must be addressed to the coupling switch or coupling switches between NRT and RT domain.

From the NRT telegram received at the coupling switch it must be evident that the NRT data is to be sent via RT communication of the RT domain and not via NRT communication of the RT domain.

If a telegram is received at the NRT port of the coupling switch which fulfills the above requirements the data content of the NRT telegram is separated and written as an RT data set into the storage area of the RT peripheral image in the Ethernet switch. In the next isochronous cycle this data will be sent as a component of the RT peripheral image in the RT domain.

The following applies for the opposite direction: If at the coupling switch RT telegrams to the ports of the RT domain or are received correctly (undisturbed) they are entered into the storage area as a component of the RT peripheral image. From there the software can read the data and integrate it into the frame of NRT telegram. This telegram will then be sent via the ports of the NRT domain. This NRT telegram must then be sent with higher priority to guarantee the fastest possible transmission (within the isochronous cycle) to the receive switch in the NRT domain.

Another particular advantage is that the published method can be used in automation systems particularly for and in packaging machinery, presses, plastic injection moulding machines, textile machines, printing machines, machine tools, robots, handling systems, woodworking machines, glass and ceramic processing machines as well as lifting equipment.

BRIEF DESCRIPTION OF THE DRAWINGS

Preferred exemplary embodiments of the invention are explained in more detail below with reference to the drawings. The drawings show.

DETAILED DESCRIPTION OF INVENTION

Figure 1:
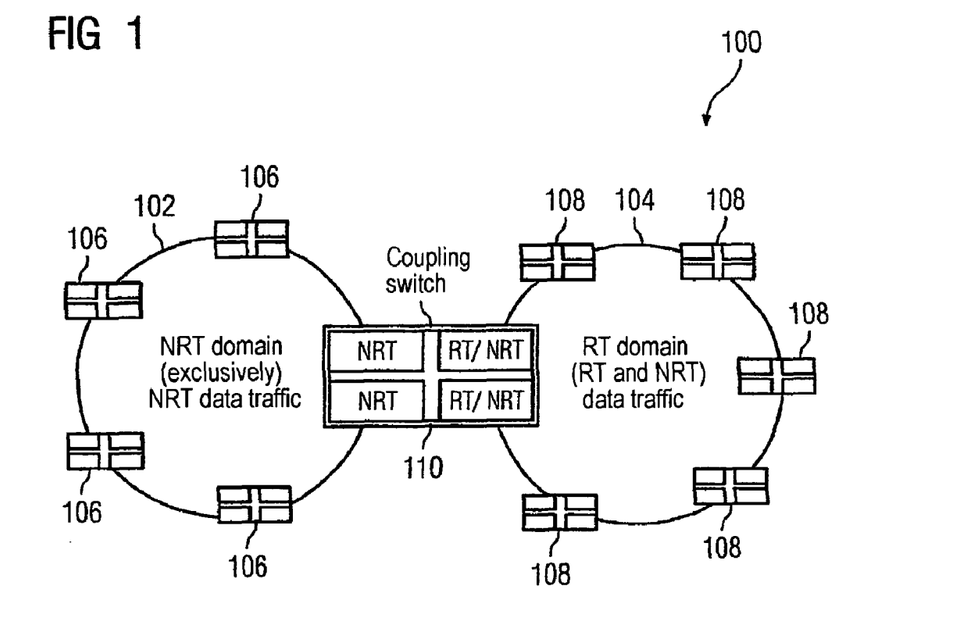
FIG. 1: a communication system with a subnetwork with realtime data traffic and a subnetwork with non-realtime data traffic.

FIG. 1 shows a communications system 100 with a subnetwork 102 and a subnetwork 104. An NRT domain is realized by subnetwork 102 which is exclusively suited to NRT data traffic. Such a subnetwork can for example be a standard Ethernet. Non-realtime subscribers 106 belong to subnetwork 102.

Subnetwork 104 is an isochronous cyclic realtime Ethernet by which the RT domain is realized. Preferably there can also be NRT data traffic in the RT domain. A communications system known per se from DE 10058524 A1 can be used for this for example in which a communication cycle is divisible into a realtime and a non-realtime subcycle. Realtime subscribers 108 belong to subnetwork 104.

The subnetworks 102 and 104 are coupled to each other by a coupling switch 110. The coupling switch 110 allows forwarding of data telegrams from the NRT domain into the RT domain and does this both for the RT and also optionally for the NRT data traffic in the RT domain. Conversely coupling switch 110 allows forwarding of data telegrams from the RT domain into the NRT domain of subnetwork 102, which can involve both RT and also NRT data telegrams.

Of particular advantage here is that the existing non-realtime capable subscribers 106 can be used to set up the communication system 100, i.e., that it is possible to refer back to the existing hardware to set up the communications system 100, which reduces investment outlay. To couple in subscriber 106 it is only necessary to install an additional program.

Figure 2:
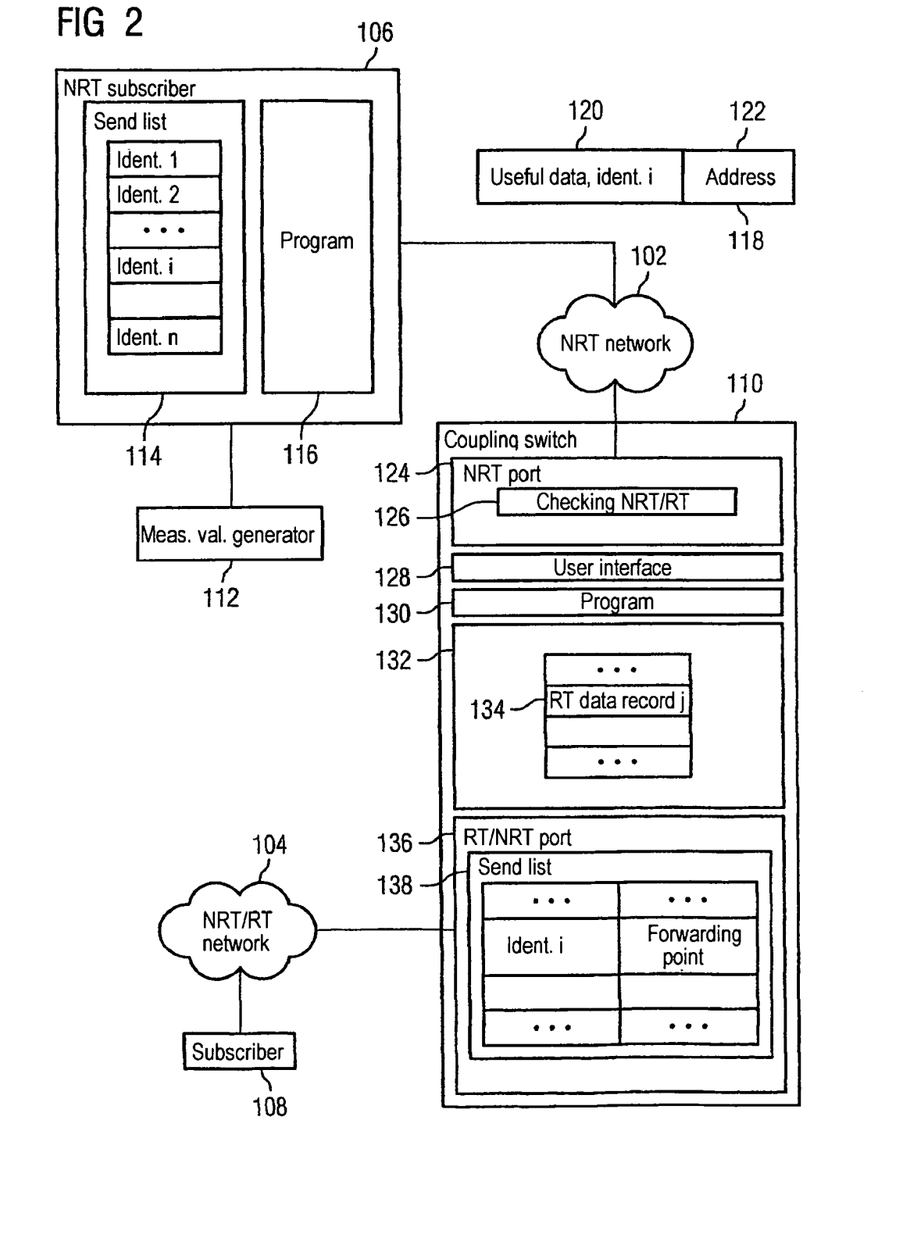
FIG. 2: a block diagram of a preferred exemplary embodiment of a coupling of a non-realtime subscriber to a realtime capable communications system.

FIG. 2 shows a block diagram of an embodiment of this type of coupling of a subscriber 106 into a coupling switch 110.

The subscriber 106 is connected to one or more measured value generators 112. The measured value generators 112 constantly deliver measured values which must be transmitted in real time to another subscriber 108.

For this purpose subscriber 106 contains a send list 114. The send list has a sequence of identifications i, with each of the identifications of the send list 114 corresponding to a data telegram to be created.

The program 116 of the subscriber 106 repeats processing of the send list 114 cyclically. If it is the turn of identification i, program 116 accepts the current value of measured value generator 112 and generates a non-realtime data telegram 118 from it. The data telegram 118 can for example be an Ethernet telegram.

The data telegram 118 has a useful data zone 120 and an address zone 122.

The useful data zone 120 carries the useful data, i.e. the current measured values of measured value generator 112 as well as the corresponding identification i. Since the data telegram is intended for realtime communication a corresponding realtime identification will be coded by program 116 into the data telegram 118. In the exemplary embodiment looked at here this is done by selecting a specific multicast address for the address in the address zone 122. This specific multicast address indicates that the data telegram 118 concerned is a data telegram intended for realtime communication.

Data telegram 118 will be sent by subscriber 106 via subnetwork 102 and received by the coupling switch 110.

The coupling switch 110 has an NRT port 124 which is used for coupling the coupling switch 110 with the subnetwork 102. The port 124 has a module 126 to check whether the data telegram received from the subnetwork 102 is intended for realtime communication or for non-realtime communication. In the embodiment under consideration here the check is made by the module 126 so that the addressing the address zone 122 of a received data telegram 118 is compared with the multicast address determined. If the address concerned is a specific multicast address the coupling switch 110 concludes that the data telegram received via the subnetwork 102 is destined for realtime communication in subnetwork 104.

The coupling switch 110 also has a user interface 128 via which the received data can be transferred to a program 130.

Furthermore the coupling switch 110 has a communication memory 132 which is used for storing the RT peripheral image. Each of the realtime data telegram identifications i is assigned in this case to a storage zone in the communication memory 132. For example the identification i is assigned to the storage zone 134 of the realtime data set j. This realtime data set j is a data set which is to contain the useful data from the useful data zone 120 of data telegram 118.

The coupling switch further has a port 136. Via the port 136 data telegrams can be sent into the subnetwork 104 and this can be done both during a realtime subcycle and during a non-realtime subcycle.

For the realtime subcycle the port 136 has a send list 138. The send list 138 has a sequence of realtime data telegram identifications which is processed cyclically. Each of the identifications in the send list 138 is assigned a forwarding time in this case am at which the transmission of the corresponding realtime data telegram is undertaken within a real time subcycle. Thus the identification i is especially assigned to a specific forwarding in the send list 138.

When the coupling switch receives the data telegram 118 via the subnetwork 102 at its port 124 the following process thus runs: First a check is made in the module 126 as to whether the data telegram 118 is destined for realtime communication in the subnetwork 104. If this is the case the useful data and the identification i from the useful data zone 120 are transferred via the user interface 128 to the program 130. The program 130 then stores the useful data in the storage zone 134 in the real time data set j, which is uniquely assigned to the identification i.

In parallel and independently of this the send list 138 will be processed by the port 136 in the realtime subcycle. If the data telegram with the identification i is about to be processed in the send list the data currently in the storage zone 134 will be read out.

The data telegram with this useful data will then be fed by port 136 at a specific forwarding time into the subnetwork 104 so the data telegram can reach the subscriber 108.

Figure 3:
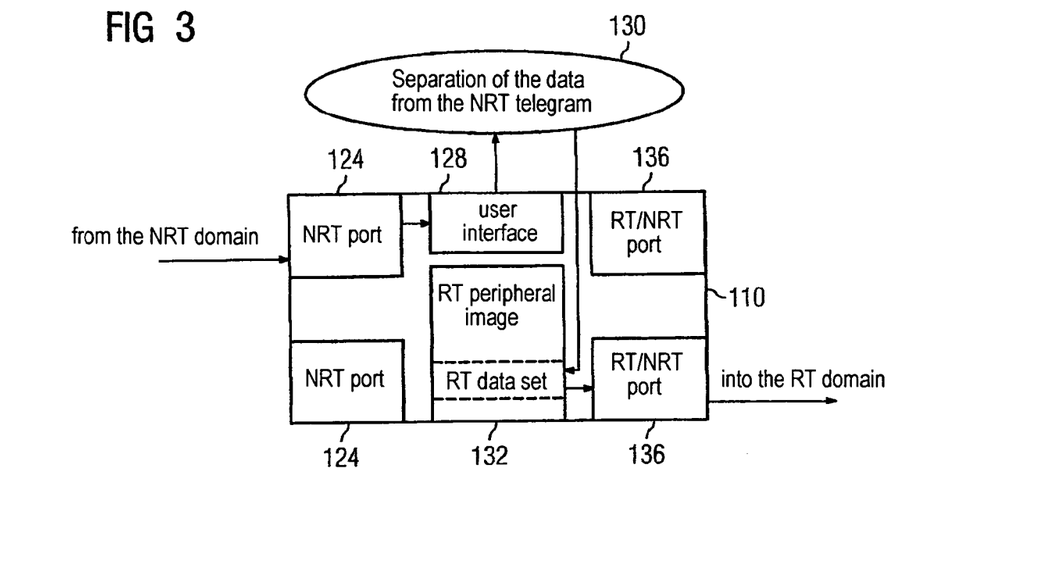
FIG. 3: the bringing in of NRT data sets into the RT domain.

FIG. 3 illustrates this process once again with the embodiment shown in FIG. 3 of the coupling switch 110, featuring a number of ports 124 and a number of ports 136.

Figure 4:
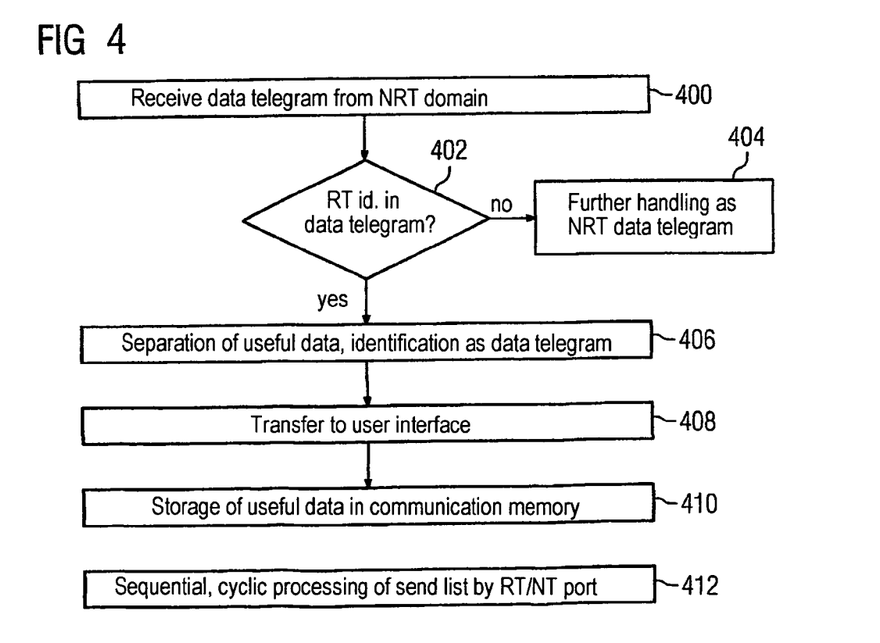
FIG. 4: a flowchart of an embodiment of a method in accordance with the invention for injecting data telegrams from the non-realtime domain into a realtime domain.

FIG. 4 shows a corresponding flowchart. In step 400 a data telegram is received from the NRT domain. in step 402 a check is made as to whether the data telegram features a specific realtime RT identification. If it does not, the received data telegram is handled in step 404 as a normal data telegram, i.e. it is forwarded unchanged by the coupling switch via the NRT subcycle. This especially allows what is known as "tunneling" of a non realtime data telegram through the realtime capable domain.

If however the data telegram involved has an RT identification the useful data and the identification from the useful data zone of the data telegram are separated in step 406 and in step 408 are transferred to a user interface. A corresponding program then stores the useful data in a storage area of the communication memory of the coupling switch which is uniquely identified by the identifier.

In parallel and independently of this, in step 412, a send list will be sequentially and cyclically processed by the RT/NRT port of the coupling switch. If at the time of creation, a real time telegram with the identification of the old useful data is still in the communication memory, this will be used. If on the other hand the useful data just received is located in the communication memory, this will be used. Preferably the useful data has a time stamp so that the receiving subscriber of subnetwork 104 (cf. subscriber 108 of FIG. 2) has information about the age of the useful data.

Figure 5:
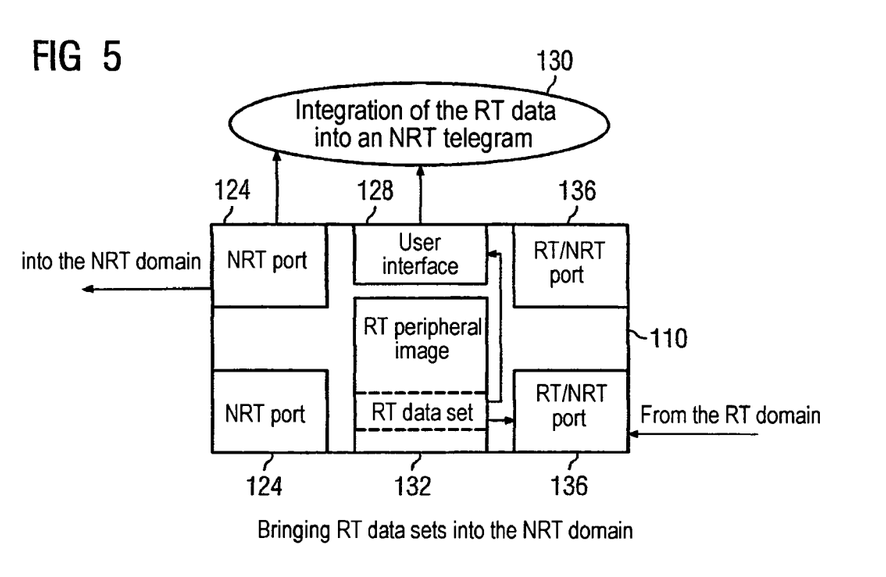
FIG. 5: the bringing-in of data sets into the NRT domain.

FIG. 5 illustrates the corresponding process in the reverse direction, i.e. from the RT domain into the NRT domain. A data telegram received by port 136 in the RT subcycle of the communication cycle is processed in such a way that the useful data of the data telegram i entered into the storage zone 132 is uniquely determined by the identification of the data telegram. Information about whether the data telegram is directed to a subscriber 106 is stored in program 130. If this is the case the useful data of the peripheral image will be integrated into a non-realtime telegram and transfer it via the user interface to NRT port 124. The non-realtime subscriber 106 is uniquely addressed by the position of the useful data in the RT peripheral image.

Program 130 then creates a standard Ethernet data telegram for example with the useful data in the useful data zone of the Ethernet telegram. The Ethernet telegram is then fed in by port 124 into the NRT domain. Program 130 can always, in each communications cycle, generate a non-realtime telegram for the corresponding useful data from the RT peripheral image 132 since in the realtime domain a se cure exchange of the data occurs in each communication cycle.

The invention claimed is:

1. A method for transmitting and changing a data telegram from a non-realtime domain into a realtime-data telegram for a realtime domain, comprising:
    creating a non-realtime data telegram with a useful data zone, the useful data zone including useful data and an identification for designating the data telegram as realtime or non-realtime;
    transmitting the data telegram via a non-realtime network to a switching coupling unit;
    receiving the data telegram through a first port of the switching coupling unit, the first port of the switching unit arranged to couple the switching coupling unit to the non-realtime network, the first port further arranged to pass exclusively non-real time data;
    checking, by the switching coupling unit, the data telegram to determine whether the identification designates realtime or non-realtime;
    if the identification designates realtime, separating the useful data and the identification from the useful data zone of the data telegram and transferring the useful data and the identification from the useful data zone to a communication memory;
    storing the useful data in a storage zone of the communication memory;
    cyclically processing the useful data to create a realtime-data telegram from the useful data stored in the communication memory, thereby changing a data telegram from a non-realtime domain to a realtime-data telegram for use in the realtime domain; and
    forwarding the realtime-data telegram in the realtime domain through a realtime network coupled to a second port of the switching coupling unit, the second port arranged to pass at least realtime data.

2. The method in accordance with claim 1, wherein, if the identification designates non-realtime, further processing the data telegram as a non-realtime data telegram.

3. The method in accordance with claim 1, wherein the identification is coded in an address of the non-realtime data telegram.

4. The method in accordance with claim 3, wherein with the address involved is a specific multicast address.

5. The method in accordance with claim 1, wherein the non-realtime data telegram involved is an Ethernet data telegram.

6. The method in accordance with claim 1, wherein the realtime domain features a communication cycle divisible into a realtime and a non-realtime subcycle, and a non-realtime data telegram from the non-realtime domain which does not have a realtime identification, is transmitted via the non-realtime subcycle in the realtime domain.

7. A switching coupling unit for receiving a data telegram from a non-realtime domain, and changing the data telegram from the non-realtime domain to a realtime data telegram for forwarding in a realtime domain, comprising:
    a first port coupled to receive via a non-real time network a non-realtime data telegram with a useful data zone, the useful data zone containing useful data and a realtime or a non-realtime identification, the first port arranged to couple the switching coupling unit to the non-real time network, the first port further arranged to pass exclusively non-real time data;
    a device to check the non-realtime data telegram for the presence of the realtime identification;
    a device coupled to transfer the useful data and the realtime identification from the useful data zone of the non-realtime data telegram to a user interface, if the realtime identification is present;
    a device to store the useful data in a storage zone of a communication memory assigned to the realtime identification;
    a device to cycle process a send list containing the realtime identification to create a realtime data telegram for forwarding over the realtime domain, thereby changing a data telegram from a non-realtime domain to a realtime data telegram for use in the realtime domain; and
    a second port coupled to forward via a realtime network the realtime-data telegram, the second port of the switching unit arranged to couple the switching coupling unit to the realtime network, the second port further arranged to pass at least realtime data.

8. The coupling unit in accordance with claim 7, wherein the device to check the non-realtime data telegram for the presence of the realtime identification further checks for the presence of a specific address in the non-realtime data telegram.

9. The coupling unit in accordance with claim 8, wherein the specific address involved is a multicast address.

10. The coupling unit in accordance with claim 7, wherein the non-realtime data telegram involved is an Ethernet data telegram.

11. The coupling unit as claimed in claim 7, wherein the non-realtime data telegram is forwarded with a realtime identification in a realtime cycle of a communication cycle.

12. A method for transmission of a data telegram from a realtime domain and changing the data telegram from the realtime domain into a non-realtime data telegram for a non-realtime domain, comprising:
    processing cyclically a receive list containing a data telegram identification of a realtime data telegram received via a realtime network;
    receiving the receive list through a first port of the switching coupling unit, the first port of the switching unit arranged to couple the switching coupling unit to the realtime network, the first port further arranged to pass at least realtime data;
    storing the useful data of the received realtime data telegram with the identification in a communication memory;
    transferring the useful data and the identification to a user interface; and
    creating a non-realtime-data telegram with a useful data zone, in which case the useful data zone is used to accommodate the useful data and the data telegram identification, thereby changing a data telegram from a realtime domain to a non-realtime data telegram for use in the non-realtime domain; and forwarding the non-realtime data telegram in the non-realtime domain through a non-realtime network coupled to a second port of the switching coupling unit, the second port arranged to pass exclusively non-realtime data.

13. The method in accordance with claim 12, wherein the realtime domain features a communication cycle divisible into a realtime subcycle and a non-realtime subcycle, and a non-realtime data telegram received from the realtime domain via a non-realtime subcycle of the communication cycle is forwarded unchanged into the non-realtime domain.

14. A switching coupling unit for transmission and change of a data telegram from a realtime domain into a non-realtime data telegram for a non-realtime domain, comprising:
- a first port coupled to receive a list which contains data telegram identifications of realtime-data telegrams, the first port arranged to couple the switching coupling unit to a realtime network, the first port further arranged to pass at least realtime data;
- a device to cyclically process the received list;
- a device coupled to store the useful data of a received realtime data telegram in a communication memory;
- a device coupled to transfer the useful data and the identification to a user interface; and
- a device to create a non-realtime data telegram with a useful data zone, in which case the useful data zone is used to accommodate the useful data and the data telegram identification, thereby changing a data telegram from a realtime domain to a non-realtime data telegram for use in the non-realtime domain; and
- a second port coupled to forward the non-realtime data telegram to the non-realtime domain via a non-realtime network, the second port of the switching unit arranged to couple the switching coupling unit to the non-realtime network, the second port further arranged to pass exclusively non-realtime data.

15. The coupling unit in accordance with claim 14, wherein the realtime domain features a communication cycle, divisible into a realtime subcycle and a non-realtime subcycle, and a non-realtime data telegram received from the realtime domain via a non-realtime subcycle of a communication cycle can be transferred unchanged into the non-realtime domain.

* * * * *